United States Patent [19]

Adishian et al.

[11] Patent Number: 4,995,589
[45] Date of Patent: Feb. 26, 1991

[54] BELLOWS VALVE

[75] Inventors: David Adishian, Palos Verdes Estates; Ira J. Silverman, Northridge, both of Calif.

[73] Assignee: Sequioa Controls Company, Ltd., Carson, Calif.

[21] Appl. No.: 472,005

[22] Filed: Jan. 29, 1990

[51] Int. Cl.[5] ............................................. F16K 31/00
[52] U.S. Cl. .................................. 251/335.3; 251/63.5
[58] Field of Search .................... 251/63.5, 63.6, 335.3

[56] References Cited

U.S. PATENT DOCUMENTS

| 4,526,341 | 7/1985 | Thomas | 251/335.3 |
| 4,687,017 | 8/1987 | Danko et al. | 251/335.3 |
| 4,804,164 | 2/1989 | Nakazawa et al. | 251/335.3 |

FOREIGN PATENT DOCUMENTS

| 0322406 | 6/1989 | European Pat. Off. | 251/335.3 |
| 2842813 | 4/1980 | Fed. Rep. of Germany | 251/335.3 |
| 2619432 | 2/1989 | France | 251/335.3 |

Primary Examiner—A. Michael Chambers
Attorney, Agent, or Firm—Skjerven, Morrill, MacPherson, Franklin & Friel

[57] ABSTRACT

A gas flow bellows valve of low profile, low purge volume and high gas flow includes an externally pressurized bellows surrounding a stepped valve stem. A self-centering toroidal guide seals in line contact with the main valve body and a bonnet with the valve stem being translatable therein. A valve actuator includes a valve piston connected to the stem and positioned between a pair of recesses in an actuator base and an actuator removable cap. A flat wave spring is positioned in one or the other of the recesses to alternatively bias the piston and stem to a valve normally closed or a valve normally open condition. Alternatively the spring may be removed entirely and the valve can function as a double-acting valve controlled by air pressure ports in the actuator base extending to one recess and in the actuator cap extending to the other recess. A relatively large diameter valve seal extends from the bottom end of the stem and seals in a closed position on a large diameter valve seat at the bottom of a central valve cavity. Fluid inlet and outset passages with smooth transition sections allow for fluid passage through a relatively large flow orifice between the stem seal and valve seat adjacent to the inlet and outlet passages.

17 Claims, 3 Drawing Sheets

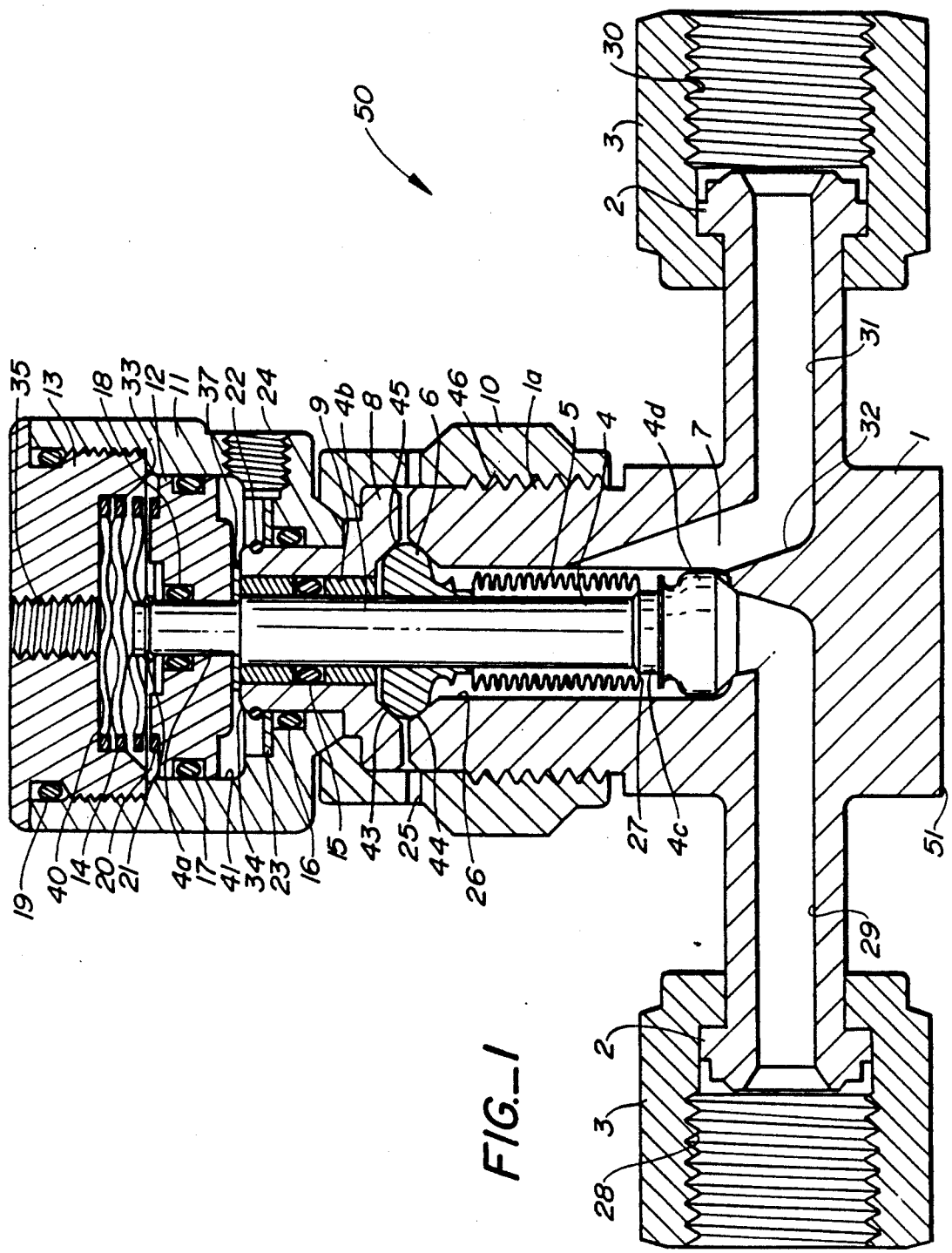
FIG._1

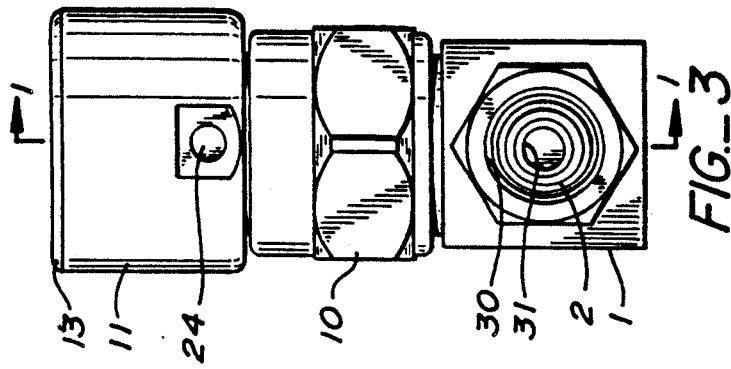
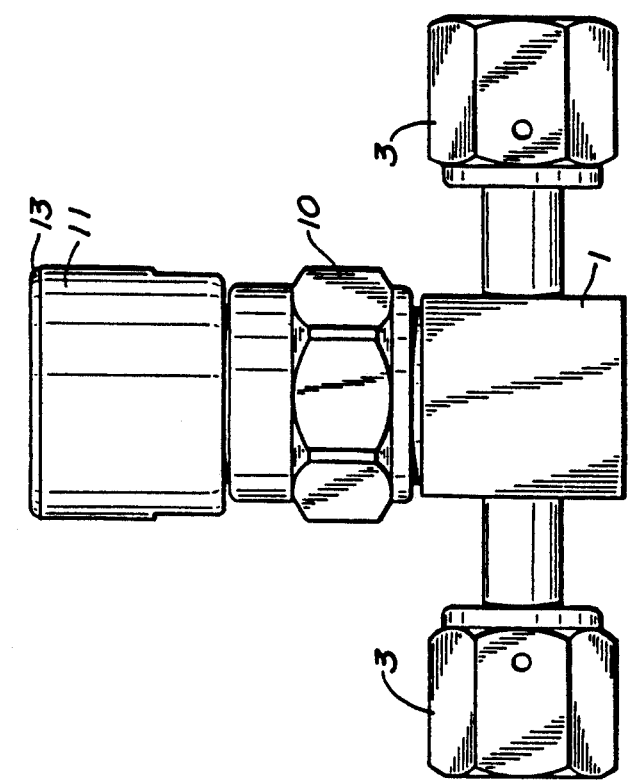
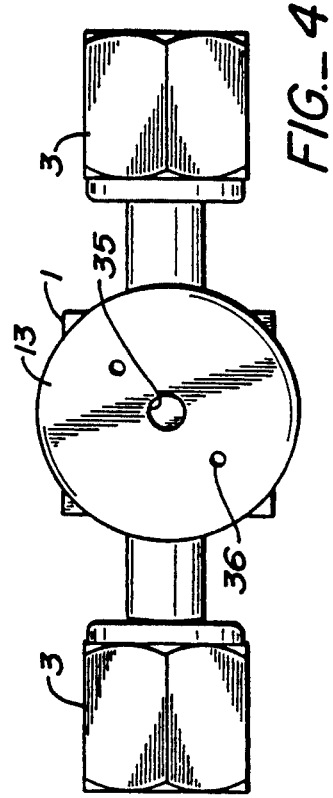

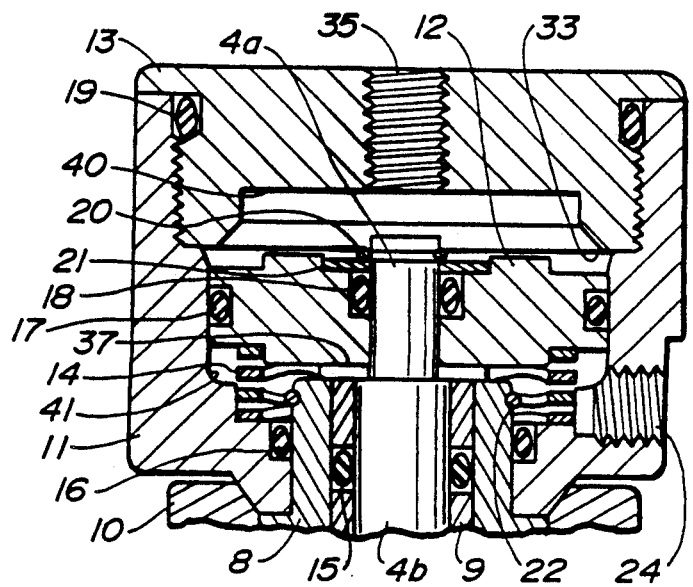
FIG._7
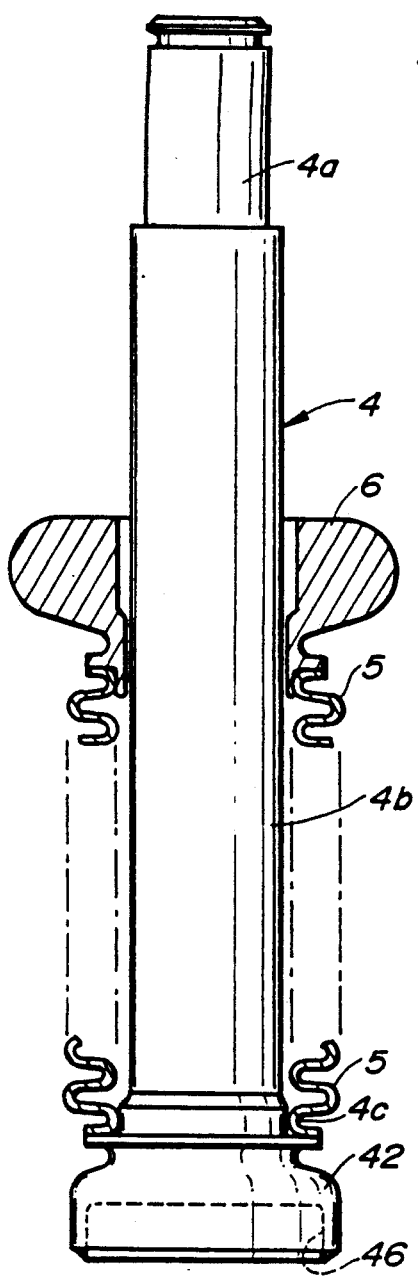
FIG._5
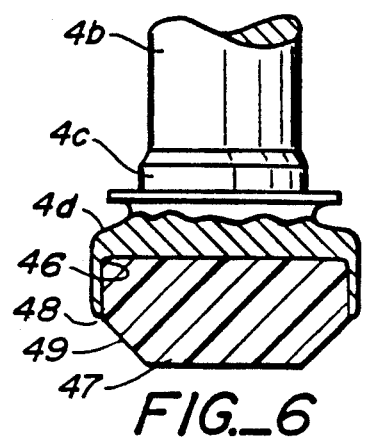
FIG._6

BELLOWS VALVE

FIELD OF THE INVENTION

This invention is directed to an application specific spring-operated bellows valve. More particularly, the invention is directed to a bellows-type gas valve designed expressly for ultra-high purity service.

BACKGROUND OF THE INVENTION

Bellows-type valves have been utilized for heating systems fluid flow as seen in U.S. Pat. No. 1,875,672 in which the valve stem attached to an actuator is sealed by a bellows, the convolutions of which allow movement of a valve sealing disc on the stem into and out of contact with a valve seat. Other fluid control valves exemplified by U.S. Pat. No. 3,074,685 suggest use of a stepped valve stem and a helical spring urging the valve into a closed portion on a valve seat. Gas flow control valves sold by the Nupro Company of Willoughby, Ohio, under the model designations Nupro BK, HB and BN incorporate a sealing disc on a stepped stem in a bellows-type valve including a relatively long helically-coiled spring(s) above the valve housing. The Nupro HB and BN construction is believed to incorporate at least parts of the construction shown in U.S. Pat. No. 4,634,099, assigned to the Nupro Company. These valves also incorporate a valve actuator piston attached to the top of the valve stem which piston is operable to open and shut the valve at a valve seat below an externally pressurized bellows surrounding the opposite end of the valve stem. Similar valves are sold by Parker Hannifin Corp. of Cleveland, Ohio under the Parker P4K designation and by Fujikin International, Inc. of Osaka, Japan under the FUJIKIN FP designation. Each of the above gas flow control valves includes an inclined flow passage extending outwardly from below the valve seat and an overall relatively high profile due to the inclusion of a coil spring biasing of the actuator piston The '099 patent does suggest an alternative for biasing the valve alternatively in an open condition but since different springs are utilized the valve is not symmetrical. Further, these valve apparently are not capable of double-acting operation. Additionally, the above gas flow valves do not provide an accurate valve stem guide, particularly one which is inherently non-particulating and contaminant free. Still further they include a relatively large internal volume necessitating a high volume of gases to be removed from the valve during purging operations. Additionally these prior art gas valves have a relatively small seal and seat diameter resulting in a relatively low gas flow rate through the annular orifice between the seal and seat.

SUMMARY OF THE INVENTION

The present invention incorporates several improvements to prior art gas flow valves which simplifies the overall construction including minimizing the number of parts and required seals and providing a low profile valve. Primarily, a flat spring, more particularly a flat wave spring, is provided which may be placed in a first recess in an actuator cap to bias the actuator piston to a valve closed position or alternatively the same spring placed in a recess between the actuator piston and an actuator base to bias the piston to a valve open position. Further, the flat spring can be removed altogether by simply removing the actuator cap (and the piston if the spring is in the second recess) so that the piston (and valve) becomes double-acting. These operational variations can be accomplished without exposing the flow path of the fluid being passed through the valve inlet and outlet passages to the contamination from contaminants entering the flow bore of the valve body from the piston-containing actuator base in a spring-changing open condition.

The present gas flow valve includes a toroidal guide of pure corrosion-resistant metal having a semispherical outer contour which provides for self-centering of the guide and the valve stem and for line contact sealing with a 90° V-groove formed by a cylindrical bonnet 45° inner-facing flat conical surface and a 45° flat conical entrance surface at the top of the valve body bore. High sealing compression is achieved by moderate bonnet nut torques and resulting compression forces operating over the small line contact sealing area. This construction also aids in minimizing the internal diameter and length of the valve bore yielding a significantly reduced dead volume between the outer surface of an externally pressurized bellows within the bore and the valve bore walls. This results in a far cleaner system than internally pressurized bellows and the low volume surrounding the bellows is only 35% to 75% of that of prior art valves, thus greatly improving the purgability of the valve. A stem valve seal is provided that approximates the valve bore internal diameter allowing only sufficient clearance so that the seal may move in the bore with the valve stem and as guided by the toroidal guide. With an equally wide valve seat in the valve bore bottom, a relatively wide diameter flow orifice results, giving a high flow capacity as much as 40% above that of standard prior art valves. The seal has a fine surface finish and is contoured to the valve seat with low seating stresses with seal abrasion and particulation essentially eliminated. The resulting wide seal area minimizes any diffusion effects, i.e gas permeability.

The valve body features smooth flow transitions and fine flowpath surface finishes to eliminate particulation, particle entrapment and contamination. The design has minimum dead volume or entrapment areas in the valve body flowpath. All flow transitions occur along controlled radii resulting in low flow losses (high flow coefficient) and with essentially no entrapment zones. The valve body port configuration in conjunction with the spring force applied through the actuator section allows the valve to operate with flow media pressure above or below the valve seat (inlet and outlet ports may be interchanged) making the valve design truly bi-directional.

BRIEF DESCRIPTION OF THE DRAWINGS

FIG. 1 is a cross-sectional side view of the cylindrical valve of the invention taken on the line 1—1 of FIG. 3.

FIG. 2 is a side view of the valve.

FIG. 3 is an end view of the valve.

FIG. 4 is a top view of the valve.

FIG. 5 is a detailed partial sectional view of the bellows attachment.

FIG. 6 is a cut-away partial cross-sectional view of the lower stem and seal.

FIG. 7 is a partial cross-sectional view of the valve with the wave spring in a valve-open operational mode.

DETAILED DESCRIPTION

As seen in FIG. 1, the valve 50 includes a metal valve body 1 typically machined from stainless steel having a central bore 26 and a conical entrance 44 extended preferably at a 45° taper. An inlet passage in the form of a bore 29 extends from a bottom block-like valve portion 51 from a connection gland 2 surrounded by an internally-threaded connection nut 3 having internal threads 28, 30. The bore 29 extends to a central position of block 51 and terminates in an annular valve seat 7 having a typical outside diameter of 0.7 cm at the bottom of bore 26. Similarly, an outlet passage in the form of a bore 31 is machined at the opposite side of the valve body extending from gland 2 to an inclined bore 32 terminating in a valve cavity or bore 26 at a position opposite a bellows 5 within the valve bore. The bores 29 and 31, in a 100 cubic centimeter per second flow valve, typically have an internal diameter of 0.5 cm and have a very smooth transition zone of about 0.2 cm and about 1.0 cm extending to the valve seat 7 and bore 26, respectively. Valve bore 26 typically has a ID of 1.0 cm and length of 2.2 cm. The ID is less than half the 2.2 cm OD of the cylindrical valve body at its upper end. A three-stepped integral valve stem 4 having a relatively narrow diameter upper end 4a extending through a valve actuator piston 12 to a washer 21, a medium diameter midspan 4b within the bellows 5, and within a valve guide 6 and a valve bonnet 8, a wide diameter lower portion 4c, and a larger diameter end 4d containing the seal cavity 46. The bottom end of the bellows is welded to the top of portion 4c. A valve seal 47 is inserted and crimped into cavity 46 of stem portion 4d. Stem portion 4b is guided in linear movement by an outboard surrounding toroidal guide 6 which is self-centering. The top of the bellows is welded to the bottom of guide 6. Guide 6 has a semispherical peripheral surface 45 which is in circular line contact in a 90°-Vee formed by the 45° conical surfaces 43 and 44, respectively, of the bottom interior of bonnet 8 and the valve bore entrance Threading down of a bonnet nut 10 on exterior threads 46 on the valve body 1 forces the bonnet 8 downwardly and results in the line contact with the toroidal guide semispherical surface and the juxtaposed slightly spaced facing surfaces of the bonnet and valve body annular top surface. The actuator base 11 is retained by the bonnet 8 by a washer 23 and retainer ring 22.

A sniffer opening 25 is provided in the bonnet nut 10 adjacent these spaced surfaces so that a gas sniffer can detect any gas fluid leakage around the guide 6, particularly across conical surface 44.

A pair of interference fit bushings 9 and a single O-ring 15 therebetween surrounds an upper portion of valve stem section 4b through which the stem 4 translates. A washer 37 is provided resting on the top of the bushings and the top of bonnet 8. The piston 12 is fixed to a minor diameter pilot stem portion 4a by washer 21 and a retainer ring 20. The piston is sealed during piston movement by O-rings 17 and 18 extending between the piston and an open-top actuator base 11, and between the piston and stem portion 4a. O-ring 16 seals the actuator base 11 and bonnet 8. An essentially flat wave spring 14 such as the Model 6066, manufactured by the Smalley Steel Ring Co. of Wheeling, Ill. is shown positioned in a circular recess 40 in an actuator cap 13. Other types of flat springs, such as a Model W series from the Barnes Group of Bristol, Conn. or a Belleville spring may be utilized. In this position the wave spring functions to bias the valve stem 4 and its attached valve seal 42 in a normally closed position against the valve seat 7. Alternatively, the actuator cap can be threadedly removed by a tool inserted into spaced cap wells 6, the spring lifted out, the retainer ring 20 removed, piston 12 lifted out and the spring reinserted in circular recess 41 in the actuator base 11 as illustrated in FIG. 7. Upon reassembly of the piston and cap the wave spring in the recess 41 will bias the piston 12 outwardly so that the valve is in a normally open condition with the valve stem 4 and attached seal 42 displaced linearly from valve seat 7. Valve sealing, and/or the return force is provided by the flat wave spring that imparts a high initial seating force and high force gain in a compact volume. This allows for an especially low actuator profile that is 56% shorter than that of a standard actuator. In a third alternative mode of operation the spring is removed altogether, permitting the piston to be double-acting, i.e., capable of moving from recess 40 to recess 41 and vice versa.

Control of the piston movement is provided by pressure in the form of air or hydraulic fluid pressure entering the recesses 41, 40 through actuator inlet ports 24 and 35 in the actuator base and actuator cap, respectively, and dependent on the placement of or lack of a wave spring in the actuator. Actuator inlet port 35 is shown in FIG. 2 as being on the central longitudinal axis of the actuator section. An 0-ring 19 seals actuator cap 13 within actuator base 11.

The valve stem is a one piece, stepped diameter design fabricated from corrosion resistant metal such as 316 stainless steel that provides piloting through the valve bonnet assembly and captures the valve seal in a precision cavity. The stem is control-crimped around the contoured seal plug 47 to eliminate any virtual leaks. The upper, stepped minor diameter 4a of the stem locates and supports the actuator piston and provides a direct linkage between the actuator and valve sections. A first stem travel stop 33 is provided by overlapping the cap 13 inner end periphery surrounding cap recess 40 and the upper outer periplural edge of the piston. A bottom second travel stop is formed by the impacting of the piston bottom surface, more particularly the washer 37 which rides with the piston and stem, with the top of the bonnet 8. These stops eliminate the possibility of overstressing either the spring or the bellows. As mentioned earlier, the valve stem is encapsulated by the externally pressurized bellows, and except for a small segment 4d that holds the valve seal, is isolated from the valve flowpath, resulting in an inherently clean construction.

Bellows 5 is welded by electron beam or orbital TIG at its top to a bottom portion of guide 6 and at its bottom to the extension 4c of the stem 4 so it surrounds intermediate portions 4b and 4c of the stem. Seal retaining portion 4d at its lower end captures a plastic (Kel-F plastic or the like) or metal seal 47 for sealing against valve seat 7 in a valve closed condition. As seen in FIG. 6, portion 4d includes an end cavity 46 into which seal 47 is crimped by the drawing in of the circular edge 48 of the retaining portion 4d. Seal 47 includes a bevel 49 on its outer peripheral edge which sits on valve seat 7 in the valve closed piston.

Opening of the valve by upward movement of the piston 12 and attached stem 4 allows flow communication between inlet bore 29 and outlet bores 32, 31 through a relatively large annular orifice between stem seal 47 and seat 7 to control the flow of fluid in the valve open condition. This large diameter valve seal and seat which respectively have an OD of 0.9 cm and 0.7 cm, and fine surface finishes of about 2 RMS provide a high flow capacity that is 40% above that of standard valves.

The seal itself has a fine surface finish and is contoured on bevel 40 to the valve body seat, effecting a leak-tight seal with low seating stresses which eliminates seal abrasion and any tendency to particulate, while the wide sealing band minimizes any diffusion effects.

The bellows has an external diameter approximating the valve bore ID but less than that diameter, to allow the convolutions of the bellows to expand or contract dependent on the direction which stem 4 is being moved by piston 12 movement The miniature bellows is a product of computer aided engineering technology in order to optimize all critical characteristics, among them high cycle life, leak tightness, and corrosion resistance. As seen in FIG. 5 which is drawn to scale, the bellows 5 has a multiconvolution externally pressurized construction which minimizes deflection per convolution and results in an extremely high cycle life. By utilizing an externally pressurized bellows, dead volume is significantly reduced and a bottom section of the valve stem 4 is encapsulated by the bellows, resulting in a far cleaner system than earlier, internally pressurized designs. The bellows fits into a small ID valve bore yielding an extremely low internal volume (35%–75% of standard valves) and greatly improves the purgability of the valve.

Symmetry of the overall actuator design allows the actuator base to be rotatable a full 360° about an upper cylindrical section of bonnet 8 and sealed therewith by O-ring 16, to put the actuator air pressure inlet 24 wherever the user desires, i.e., universal positioning. This allows connecting tubing (not shown) to come from any desired direction. The above-described valve is designed for both positive pressure and high vacuum services.

The above description of an embodiment of this invention is intended to be illustrative and not limiting. Other embodiments of this invention will be obvious to those skilled in the art in view of the above disclosure.

We claim:

1. A bellows valve comprising:
    a metal valve body having an inlet passage, an outlet passage, a valve cavity in fluid communication with said passages, and a valve seat in said cavity interfacing between said passages;
    a translatable cylindrical valve stem, on end which is selectively cooperable with the valve seat to control the flow of fluid between the said passages, and another end of which is directly linked to an actuator assembly;
    a bellows surrounding a portion of a lower diameter of said stem for isolating and sealing said stem from a system fluid passing through the valve chamber, such that the system fluid exerts an external compressive force on said bellows;
    said valve cavity having an open end to accept said stem and said bellows;
    wherein said actuator assembly is removably connected to said valve body and directly communicates with said stem and includes a positive linkage including an actuator piston connected to said valve stem and a flat spring of the wave or belleville type abutting an operating surface of said piston to control system fluid flow through the valve seat in one direction by the application of pressure to an actuator inlet port, and in the other direction by a force exerted in a return direction by said flat spring; and
    further including guide means for one-piece construction for centering and sealing said stem, said guide means surrounding and spaced from said valve stem and positioned in sealing contact between said valve body and a metal valve bonnet surrounding an upper diameter of said stem.

2. The bellows valve of claim 1 wherein said actuator assembly further includes an open-top actuator base connected to said valve body; a generally flat actuator cap threadably insertable into said open-top actuator base for closing said actuator base open-top; said actuator piston being movable into operable positions along a cylindrical sidewall of said actuator base in a piston chamber between said actuator base and said actuator cap; and recess means in said piston chamber for receiving said flat spring, said flat spring biasing said piston in one direction.

3. The bellows valve of claim 2 wherein said recess means is in said actuator cap and said piston is biased by said flat spring toward said valve seat.

4. The bellows valve of claim 3 wherein said flat spring exerts a bias on a surface of said piston facing away from valve seat to seat said valve stem on said valve seat.

5. The bellows valve of claim 2 wherein said recess means is in said actuator base and said piston is biased by said flat spring in a direction away from said valve seat.

6. The bellows valve of claim 5 wherein said flat spring exerts a bias on a surface of said piston facing said valve seat to unseat said valve stem from said valve seat.

7. The bellows valve of claim 2 wherein said recess means includes a first recess in said actuator cap facing one surface of said piston and a second recess in said actuator base facing another surface of said piston and wherein said flat spring is interchangeably mounted in one of said recesses dependent on whether said valve is to be normally open or normally closed.

8. The bellows valve of claim 1 wherein said guide means is a metal toroidal guide and said stem is translatable in said guide and said guide is in tangential sealing contact with said valve bonnet and said valve body.

9. The bellows valve of claim 8 wherein said valve bonnet and said valve body are in facing juxtaposed position and together form an internal flat sidewall circumferential V-groove and said toroidal guide includes a semispherical outer surface, said guide having said outer surface in metal-to-metal line contact with the respective sidewall of said V-groove.

10. The bellows valve of claim 9 wherein said V-groove subtends an arc of 90°.

11. The bellows valve of claim 1 wherein said valve body is cylindrical and in which said valve cavity is a constant diameter bore having a diameter less than one-half the diameter of said valve body and said bellows closely fits in, said bore such that valve purge volume is minimized.

12. The bellows valve of claim 1 in which said stem has a stepped diameter including a minor diameter pilot portion fixedly connected to said piston and wherein said bellows surrounds an intermediate portion of said stem.

13. The bellows valve of claim 1 in which said guide means includes a first seal surface in seal contact against said valve body and sealing between said system fluid and an outer environment surrounding said valve and a second seal surface in seal contact against said valve bonnet and sealing between the outer environment and an interior pressure in the piston chamber for actuating said piston.

14. A bellows valve comprising:

a metal valve body having an inlet passage, an outlet passage, a valve cavity in fluid communication with said passages, and a valve seat in said cavity interfacing between said passages;

a translatable cylindrical valve stem, one end which is selectively cooperable with the valve seat to control the flow of fluid between the said passages, and another end of which is directly linked to an actuator assembly;

a bellows surrounding a portion of a lower diameter of the said stem for isolating and sealing the said stem from a system fluid passing through the valve chamber, such that the system fluid exerts an external compressive force on said bellows;

said valve cavity having an open end to accept said stem and said bellows; and wherein said actuator assembly includes an open-top actuator base connected to said valve body; and an actuator cap closing said actuator base open-top; an actuator piston movable into operable positions in a piston chamber between said actuator base and said actuator cap; and a first recess in said actuator cap and a second recess in said actuator base, said first recess in a first mode of operation including a flat spring of the wave or belleville type for forming a biased normally closed piston valve, said second recess in a second mode of operation including said flat spring for forming a biased normally closed piston valve and wherein the absence of said flat spring in both recesses in a third mode of operation forms an unbiased double acting piston valve.

15. The bellows valve of claim 14 wherein said valve body is cylindrical and in which said valve cavity is a constant diameter bore having a diameter less than one-half the diameter of said valve body and said bellows closely fits in said bore such that valve purge volume is minimized.

16. The bellows valve of claim 14 wherein said valve stem one end includes a valve seal having a diameter substantially the same as the diameter of said bellows and said valve seat having a diameter substantially the same of the diameter of said stem.

17. The bellows valve of claim 14 in which said stem has a stepped diameter including a minor diameter pilot portion fixedly connected to said piston and wherein said bellows surrounds an intermediate diameter portion of said stem.

* * * * *

UNITED STATES PATENT AND TRADEMARK OFFICE
CERTIFICATE OF CORRECTION

PATENT NO.   :   4,995,589
DATED        :   February 26, 1991
INVENTOR(S)  :   David Adishian and Ira J. Silverman It is certified that error appears in the above-identified patent and that said Letters Patent is hereby corrected as shown below:

Column 6, line 1, "for" should read --of--.

Signed and Sealed this

Twenty-eighth Day of July, 1992

Attest:

DOUGLAS B. COMER

*Attesting Officer*       Acting Commissioner of Patents and Trademarks